United States Patent [19]

Alexander et al.

[11] Patent Number: 4,586,835
[45] Date of Patent: May 6, 1986

[54] PRINTER FOR PRINTING CHARACTERS IN TWO ALTERNATIVE PRINT QUALITIES

[75] Inventors: Randall W. Alexander; Demetrios Troupes, both of Charlotte, N.C.

[73] Assignee: International Business Machines Corporation, Armonk, N.Y.

[21] Appl. No.: 695,997

[22] Filed: Jan. 29, 1985

Related U.S. Application Data

[63] Continuation-in-part of Ser. No. 602,248, Apr. 20, 1984, abandoned.

[51] Int. Cl.⁴ .............................................. B41J 3/12
[52] U.S. Cl. .............................. 400/121; 101/93.05; 400/124; 340/728; 340/735
[58] Field of Search ........................... 400/121, 124; 101/93.04, 93.05; 340/728, 731, 735; 178/15, 30

[56] References Cited

U.S. PATENT DOCUMENTS

| | | | |
|---|---|---|---|
| 3,553,676 | 1/1971 | Raciti | 340/735 X |
| 3,614,767 | 10/1971 | Carrell | 340/735 X |
| 3,893,558 | 7/1975 | Fulton et al. | 197/1 R |
| 3,900,094 | 8/1975 | Larsen et al. | 197/1 R |
| 3,991,868 | 11/1976 | Robinson et al. | 400/124 |
| 4,119,383 | 10/1978 | Watanabe et al. | 400/124 |
| 4,129,860 | 12/1978 | Yonezawa et al. | 340/731 |
| 4,159,882 | 7/1979 | Sanders et al. | 400/124 |
| 4,168,489 | 9/1979 | Ervin | 340/731 X |
| 4,216,480 | 8/1980 | Buehner et al. | 346/75 |
| 4,242,678 | 12/1980 | Somerville | 340/731 X |

OTHER PUBLICATIONS

H. E. Berkebile, J. M. Dunn and L. R. Nielsen; Draft-to-Text Font Conversion Algorithm, Mar. 1983, IBM Technical Disclosure Bulletin, pp. 5173/5174.
B. R. Cavill, F. Foldes, M. W. Hughes and L. Zimmerman; Printer Data Processing/Word Processing Enhanced Controller System, Apr. 1982, IBM TDB, pp. 5885/5887.
Cavill, Leontiades, Siegl, Thomas & Zimmerman; Enhanced Duty Cycle Prediction and Control for Wire Matrix Printers, Apr. 1982, IBM TDB, pp. 5430–5432.
T. L. Billings; Improvement of Sloped-Line Appearance in Dot Matrix Printing, Nov. 1978, IBM Technical Disclosure Bulletin, pp. 2239/2240.
J. E. Garcia; Low Resolution Print Quality Enhancement, Jul. 1978, IBM Technical Disclosure Bulletin, pp. 729/730.
R. E. Pence; Matrix Printer Mode Double-Width Character, May 1979, IBM Technical Disclosure Bulletin, p. 4892.
T. G. Davies, R. M. Halsey and D. R. Mersel; Character Highlighting Technique, Mar. 1976, IBM Technical Disclosure Bulletin, p. 3344.

*Primary Examiner*—Paul T. Sewell
*Attorney, Agent, or Firm*—E. Ronald Coffman

[57] ABSTRACT

A printer prints characters by printing selected character elements in a matrix of print positions arranged in horizontal rows and vertical columns. The printer includes storage means for storing sets of character data elements which are used for printing the character elements. The printer also includes logic means for selectively performing logical operations on the sets of character data elements in order to vary the sets of character data elements in accordance with certain rules and thereby vary the print quality in the horizontal, vertical and diagonal directions of the characters which will be printed using the stored character data elements.

The stored sets of character data elements are selected so that they can be used for printing characters which have a high print quality in the horizontal direction and a low print quality in the vertical and diagonal directions.

In order to print characters in a low print quality the logic means derives subsets of the stored sets of character data elements and only these subsets of character data elements are used for printing characters.

In order to print characters in a high print quality the logic means performs logical operations on the stored sets of character data elements so as to generate additional character data elements. These additional character data elements together with the stored character data elements are used for printing characters.

14 Claims, 46 Drawing Figures

4a  4b  4c

A  B  C  D  E

5a 5b  5c

FIG. 10
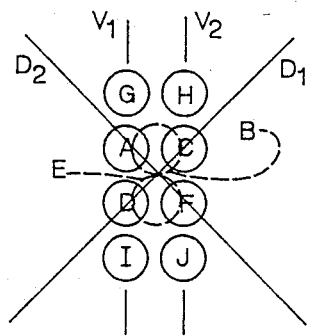
FIG. 11A FIG. 11B FIG. 11C FIG. 11D
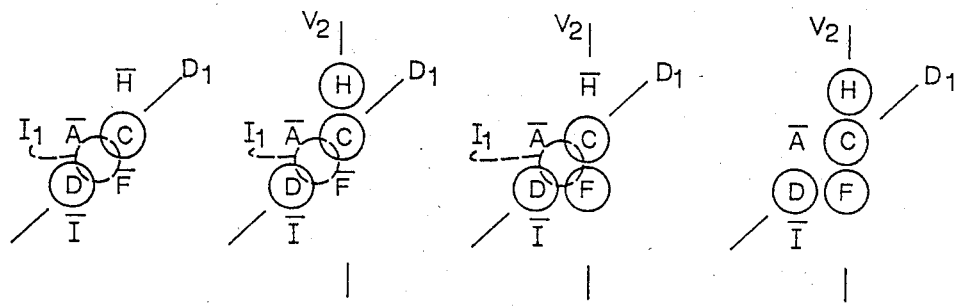
FIG. 11E FIG. 11F FIG. 11G
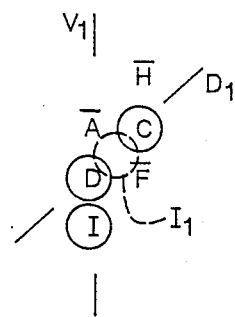 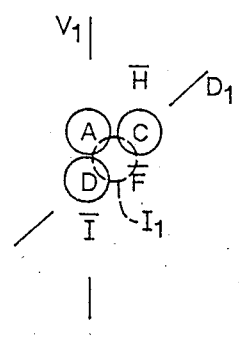 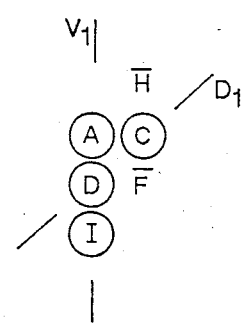

FIG. 12A  FIG. 12B  FIG. 12C  FIG. 12D
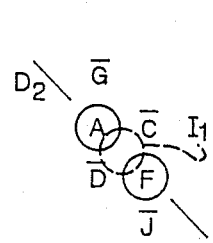
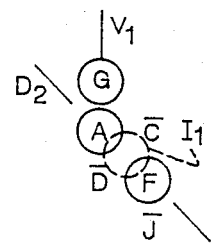
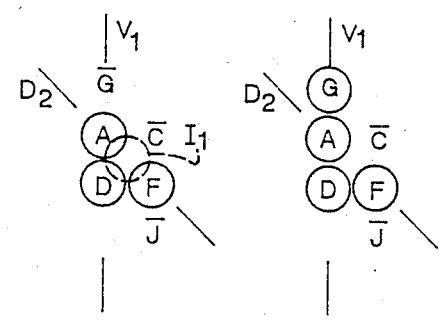
FIG. 12E  FIG. 12F  FIG. 12G
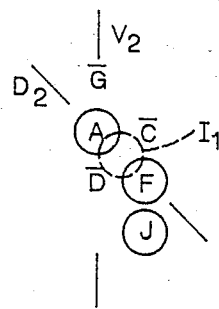
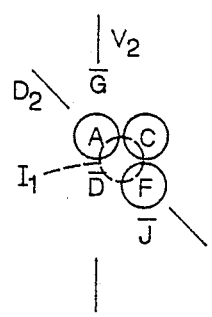
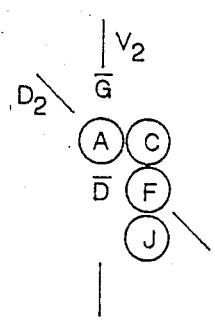

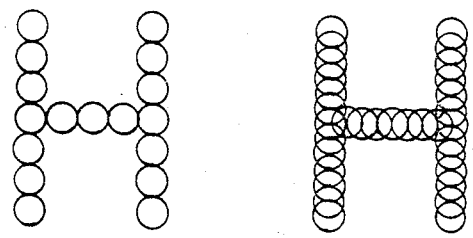
FIG. 13A
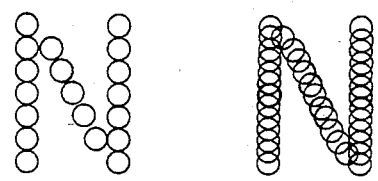
FIG. 13B
FIG. 14
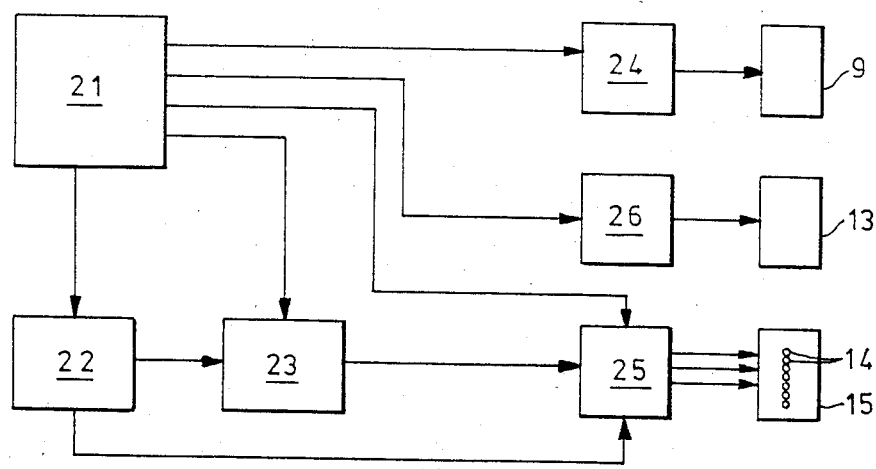

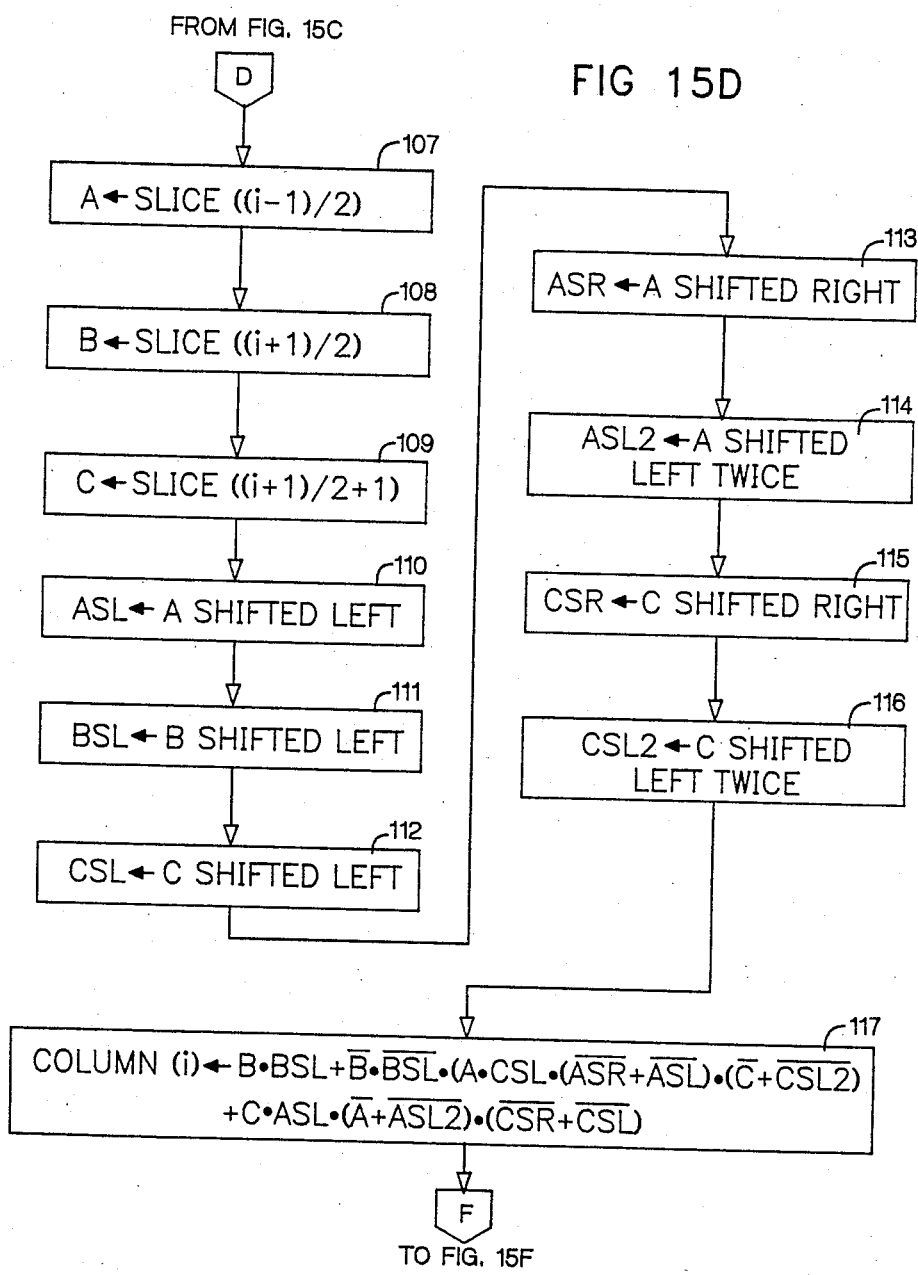

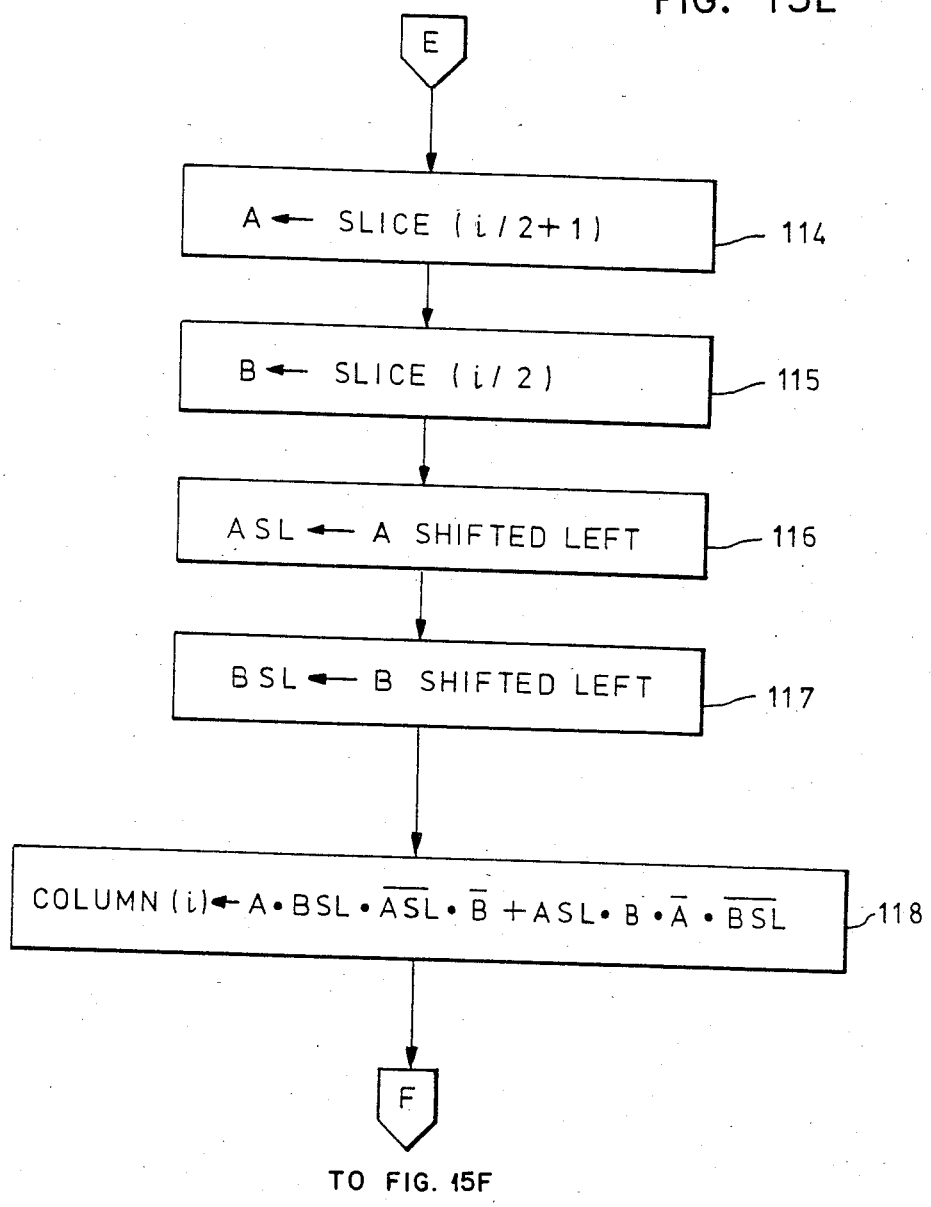

PRINTER FOR PRINTING CHARACTERS IN TWO ALTERNATIVE PRINT QUALITIES

This is a continuation-in-part application of co-pending application Ser. No. 602,248 filed Apr. 20, 1984, abandoned.

FIELD OF THE INVENTION

The present invention relates to printers of the type which are capable of printing characters in two alternative qualities of print and to methods of printing characters in two alternative qualities of print.

BACKGROUND OF THE INVENTION

It is desirable for a printer to be able to print characters in more than one quality of print, possibly at more than one speed, in order to provide, for example, a high speed of printing with a low quality of printed character and a low speed of printing with a high quality of printed character. Printing at a high speed with a low quality of printed character is commonly performed when a large volume of output is required, as in a data processing environment. On the other hand, in a word processing environment or office environment where a low volume of output is more common, a high quality of printed character is needed, for example in the printing of letters, and any associated reduction in speed is acceptable.

In matrix printers in which each character is formed by printing selected character elements, for example dot elements, in a matrix of print positions arranged in rows and columns, a high speed of printing is achieved by printing only a comparatively small number of character elements resulting in the printing of characters in a low quality. In order to improve the quality of each character additional character elements are printed in selected print positions in the matrix. The positions for the additional character elements are selected so as to provide for enhancement of each character in the horizontal, vertical and diagonal directions by selectively increasing the density of portions of the character. The expression "diagonal direction" is used herein to describe any direction which is at an angle to the horizontal and vertical directions. A printed character can be described as having high or low print quality in the horizontal direction, the vertical direction and the diagonal direction. If a printer is to print characters in more than one quality of print it will be necessary to provide data for printing in each quality. It is expensive to store all this amount of data. In order to save on storage space it is known to provide character printing data for printing each character in only one quality and to derive from this basic data additional data for printing in a higher quality. Higher quality is obtained by selectively increasing the density of the character elements printed.

Known methods of deriving additional data for printing in a higher quality use rules or algorithms which do not provide high quality for all characters and, for some characters, actually result in distortion of the character. Also the rules and algorithms are difficulty to implement in practice.

The object of the present invention is to provide a printer which is capable of printing all required characters in two print qualities without distortion and in which data for printing the characters in a required quality is derived from stored data by an improved method.

SUMMARY OF THE INVENTION

A printer in accordance with the invention prints characters by printing selected character elements in a matrix of print positions arranged in horizontal rows and vertical columns. In the printer are stored sets of character data elements. These are used to print character elements which form characters. Each set of character elements defines the shape of a respective character. The stored sets of character data elements are selected so that if a character were to be printed using any one of the stored sets of character data elements the resultant character would have a high print quality in the horizontal direction and a low print quality in the vertical and diagonal directions.

In order to print characters in a low print quality it is necessary to reduce the character data elements used so that the shape of each character is defined less densely in the horizontal direction. The printer derives and uses only a subset of the character data elements of each stored set. Each subset is chosen so that the shape of the respective printed character has a low print quality in all directions. Each subset is actually derived by taking all the character data elements of the set and excluding any character data element which, when used for printing, would result in the printing of a character element in a print position which is adjacent in the horizontal direction to a print position in which a character element would previously have been printed. This means that two character elements are not printed side by side. This reduces the density and quality of the character in the horizontal direction. Since the stored character data elements are initially chosen so that any character printed using these data elements will have a low print quality in the vertical and diagonal directions, any character printed using only a subset of character data elements as described above will have a low print quality in all directions.

In order to print characters in a high print quality it is necessary to generate additional character data elements so that the shape of each character printed is defined more densely in the vertical and diagonal directions. The printer performs logical operations on the stored sets of character data elements and detects any data elements which would result in the printing of character elements in two adjacent print positions in the vertical direction or in the diagonal direction. If any such character data elements are detected the printer generates an additional data element which would result in an additional character element being printed in the print position between these two adjacent print positions.

However, in order to avoid introducing distortion into the printed characters the generation of an additional character data element when data elements are detected which would result in the printing of character elements in two adjacent print positions in the diagonal direction does not always take place. If the printer detects a further character data element which would result in the printing of a character element in a print position adjacent to the one of the two adjacent print positions on the side nearest to the other of the two adjacent print positions then an additional character data element is not generated.

By selecting the stored sets of character data elements as those defining the shapes of characters which have a high print quality in the horizontal direction and a low print quality in the other directions and basing all the logical operations on this stored data it is found that the resultant high print quality characters are less distorted than with previous arrangements. In order to produce low print quality characters it is simple and efficient to use only part of the stored character data elements.

BRIEF DESCRIPTION OF THE DRAWINGS

These and other objects, features and advantages will be more fully understood by those working in the art by reading and understanding the following description of a preferred embodiment of the invention, wherein reference is made to the accompanying drawings, in which:

FIG. 10 illustrates possible arrangements of dots in a character, FIGS. 11a-11g and 12a-12g illustrate various different arrangements of dots used to derive a modified form of the rule for enhancement in the diagonal direction, FIGS. 13a and 13b illustrate two characters printed in two qualities of printing in accordance with the invention, FIG. 14 is a diagram of a control circuit for the printer of FIG. 1 used to implement the above principles, and FIGS. 15a to 15f are a series of flow charts representing the logical operations to be performed in order to print characters in accordance with the invention.

DESCRIPTION OF THE INVENTION

Figure 1:
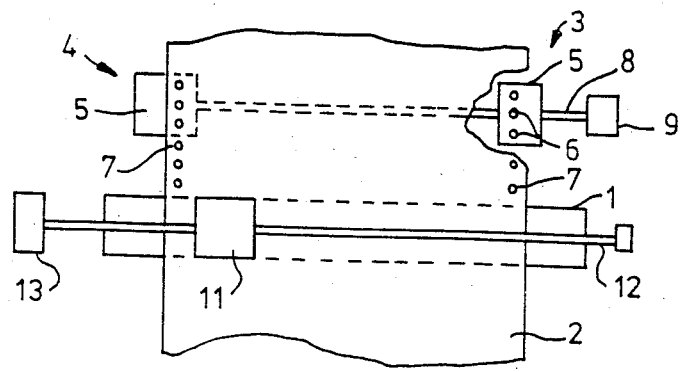
FIG. 1 illustrates diagrammatically a printer with which the invention may be used.

The invention will be described as applied to a printer of the type illustrated diagrammatically in FIG. 1. The printer includes a platen 1 over which a print medium 2, for example a continuous web of paper, is moved by means of two tractor devices 3,4. Each tractor device includes a wheel 5 provided with pins 6 on its outer surface. The pins 6 are adapted to engage with holes 7 formed adjacent to the side edges of the medium 2. The two wheels 5 are mounted on a common shaft 8 which can be rotated as required by a motor 9 in order to move the medium 2 over the platen 1.

The printer includes a print head 11 which is mounted on a support 12 extending over the platen 1 so that the medium 2 passes between the platen 1 and the print head 11. The print head 11 can be moved along the support 12 by means of a motor 13 by, for example, forming cooperating threads on the support 12 and the head 11 and rotating the support 12. The print head can thereby perform printing operations at any point on the surface of the medium 2 as the print head is moved across the medium and the medium is moved over the platen.

Figure 2:
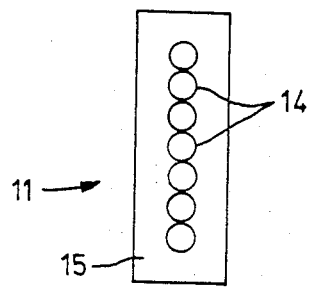
FIG. 2 illustrates the print head used in the printer of FIG. 1.

The print head 11 is formed with a row of printing elements 14 supported in a body portion 15, as illustrated in FIG. 2 which is a view of part of the head 11. The elements 14 are wires which can be selectively moved axially by, for example, using an electromagnet associated with each one, and which cooperate with an ink ribbon to perform printing operations on the medium. Each print element causes the printing of a character element or print dot and as the head moves a matrix of print dots in vertical columns and horizontal rows is printed.

This method of operation of a printer is well known and will not be described in detail.

Figure 3:
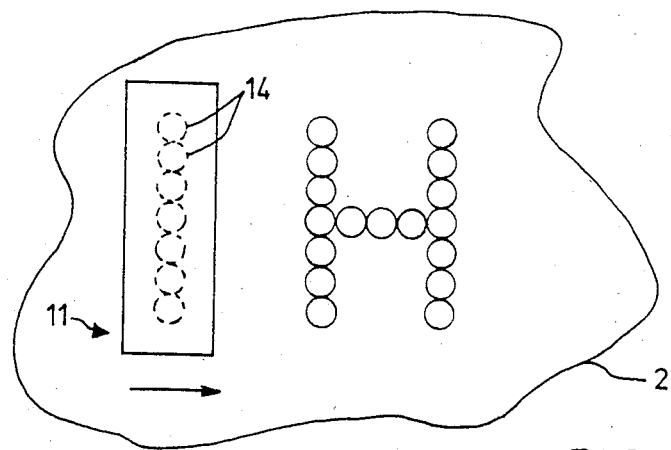
FIG. 3 illustrates how the printer of FIG. 1 performs a printing operation.

There are seven printing elements 14 arranged in a row extending perpendicular to the support 12. As illustrated in FIG. 3, which is a plan view of the print head 11 moving over the medium 2, the row of printing elements 14 moves across the medium 2 in the direction of the arrow and will print a character (H is illustrated) progressively, starting from the left side as viewed in FIG. 3, by printing print dots column by column. The elements 14 will be operated selectively so as to print the complete left vertical feature of the character first, then to print the horizontal feature progressively dot by dot and finally to print the complete right vertical feature. The size and position of the character and the distance between adjacent dots in the horizontal direction will be controlled by varying the speed of movement of the head in relation to the timing of the operation of the printing elements. The spacing of the dots in the vertical direction corresponds to the spacing of the printing elements 14. As illustrated in FIG. 3 the dots printed just touch horizontally and vertically without overlapping.

Figure 4:
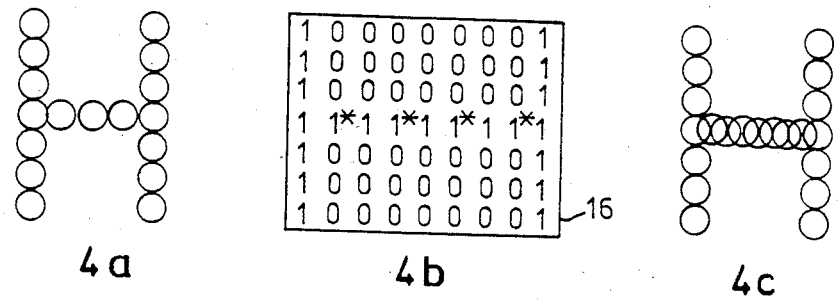
FIGS. 4a-4c illustrate diagrammatically how stored character data is utilized to provide enhancement in the horizontal direction for higher quality printing in accordance with the invention.

It is necessary to store character data for printing each character and FIG. 4 illustrates at 4b a storage device 16 which contains all the character data for printing the character H. The storage device 16 has nine columns of data storage locations. Each column has seven binary storage locations and each storage location stores a character data element. As the print head 11 moves across the medium 2 the storage device 16 is read out column by column and the data in each column used to control the row of printing elements 14, each storage location in the column corresponding to one of the printing elements 14. When a binary 1 is stored in a storage location the corresponding printing element will be operated and when a binary 0 is stored the printing element will not be operated.

As shown in FIG. 4b there are nine columns of character data elements. If it is desired to print the character H in low quality print at a high speed only certain of the data elements are used in accordance with the following rule. If two adjacent storage locations, in the horizontal direction, both contain binary 1 data elements, the second binary 1 data element, as viewed in the direction of read out of the storage device, is not used when printing a low quality character. In practice, if the print head 11 is moved across the medium 2 at a speed to print the character in low quality print it is not possible to operate each printing element 14 so that it prints the data elements contained in adjacent columns of the storage device 16. As illustrated in FIG. 4a, the low quality character to be printed is seven print dots high and only five print dots wide. The data elements in columns 2, 4, 6 and 8 in the storage device 16 are not used. As a result the data elements in the storage device 16 represented by the binary 1's bearing asterisks in FIG. 4b are not used. The use of the remaining data elements results in the printing of the character H in low quality as illustrated in FIG. 4a. It will be seen that the speed of movement of the print head is controlled in relation to the timing of the operation of the printing elements so that, in the horizontal feature of the character, adjacent print dots just touch without overlapping.

If it is desired to print the character H in high quality print, the print head 11 is moved at a slow speed and all the character data elements in the storage device 16 are used and the resultant character printed in high quality print as illustrated in FIG. 4c. This high quality print character is enhanced as compared with the low quality print character by increasing the density of the printed character elements in the horizontal direction. It will be seen that the speed of movement of the print head is controlled in relation to the timing of the operation of the printing elements so that in the horizontal feature of the character adjacent dots overlap.

In the arrangement described, the storage device 16 contains all the character data elements needed for printing the high print quality character illustrated in FIG. 4c at a low speed. In order to print the low print quality character illustrated in FIG. 4a at a high speed only a subset of the character data elements are used in accordance with the rule specified. It will be appreciated that, comparing the two forms of character in FIGS. 4a, 4c, the character in FIG. 4c is enhanced only in the horizontal direction by increasing the density of the printed character elements in the horizontal direction. It will further be apparent that only the horizontal feature of the character has been enhanced without affecting the vertical features.

Figure 5:
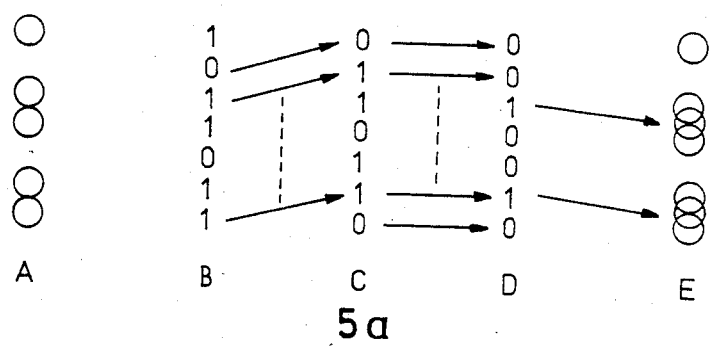
FIGS. 5a-5c illustrate diagrammatically how stored character data is added to in order to provide enhancement in the vertical direction for higher quality printing in accordance with the invention.
Figure 5:
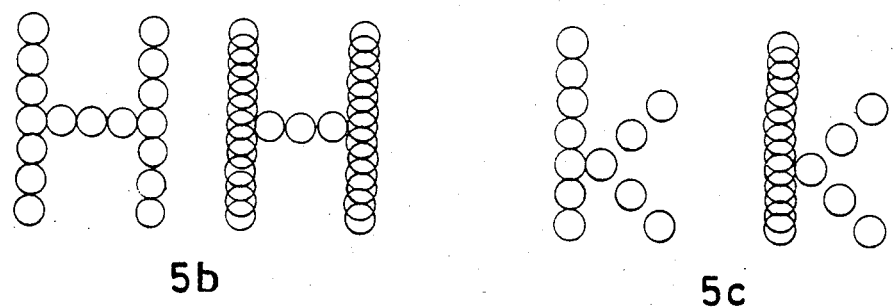

FIG. 5 illustrates a method of enhancing a character in the vertical direction in order to produce high quality printing. The rule to be applied is illustrated in FIG. 5a. The print dots for printing one column of a character in low quality print are illustrated at column A. It will be noted that at two places print dots occupy two adjacent print positions. In order to enhance the character and improve the print quality without adversely affecting the overall shape of the character, additional dots are to be provided between adjacent positions containing dots already so as to increase the density of the printed character elements in the vertical direction. In other words, considering the arrangement of print dots illustrated in column A, the application of the rule results in additional dots being printed between the pairs of dots in positions 3 and 4 and in positions 6 and 7 numbering from the top of the column. This rule is applied by performing a logical operation as illustrated in columns B, C, D. Column B represents the data elements in the storage device (such as the device 16 in FIG. 4b) which will result in the printing of dots as in column A. By using a suitable logic system the data elements in column B are all shifted upward one position (column C) and then the data elements in corresponding positions in columns B and C are ANDed together to produce the additional data elements illustrated in column D. These additional elements are used to print additional dots between the pairs of dots in adjacent positions as illustrated in column E, thereby increasing the density of the character data and the printed character elements in the vertical direction.

The above described enhancement of the character in the vertical direction is performed by two printing operations. The low print quality character as in column A is first printed by moving the print head 11 across the medium 2. The medium is then moved a distance equal to half the distance between two adjacent printing elements 14. The print head 11 is then moved across the medium again and a second printing operation is performed using the additional character data elements illustrated in column D in order to print the additional dots and form the enhanced high print quality character illustrated in column E.

FIGS. 5b,5c illustrate how the characters H,K respectively can be enhanced in the vertical direction by the above procedure. It will be apparent that only the vertical features of each character are enhanced and no change is made to features extending horizontally or at an angle to the horizontal or vertical.

FIG. 6 illustrates the rules to be applied for enhancement of a character in the diagonal direction which, as defined above, is any direction which is at an angle to the horizontal and vertical directions. First it is necessary to define two types of diagonal. FIG. 6a illustrates a "half diagonal" which occurs when the center points of two print dots are spaced apart by one dot width in the vertical direction and by half a dot width in the horizontal direction. FIG. 6b illustrates a "full diagonal" which occurs when the center points of two print dots are spaced apart by one dot width in both the vertical and horizontal directions. Dots which are spaced further apart than as in either of these two illustrations are not considered to be joined to form a line in a character and are not taken into consideration in the procedure for enhancement of the character to be described.

Figure 6A:
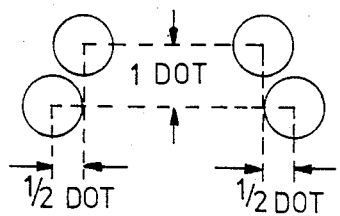
FIGS. 6a-6d illustrate diagrammatically a general rule to be applied in adding data to stored data in order to provide enhancement in the diagonal direction for higher quality printing in accordance with the invention.
Figure 6B:
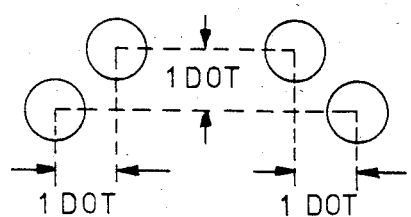
Figure 6C:
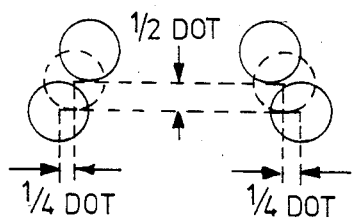
Figure 6D:
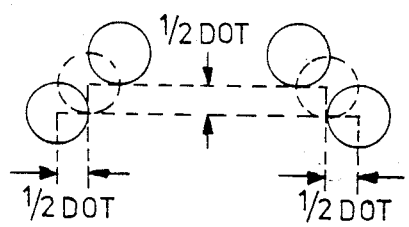

The general rule to be applied is that where a half diagonal or a full diagonal occurs in a character, fill-in dots are to be inserted in order to enhance the character for high quality print. FIGS. 6c and 6d respectively illustrate how portions of a character including half and full diagonals are to be enhanced in accordance with this general rule by inserting additional fill-in print dots between the adjacent dots in the diagonals with center spacing as indicated and thereby increasing the density of the dots or character elements in the diagonal direction.

Figure 7A:
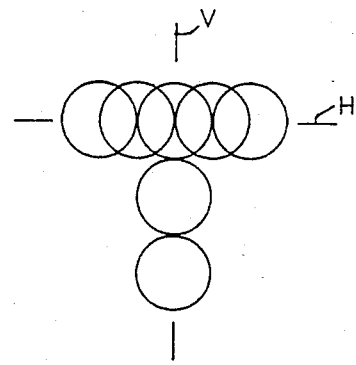
FIGS. 7a-7c illustrate a situation in which the general rule for enhancement in the diagonal direction is not to be applied.
Figure 7B:
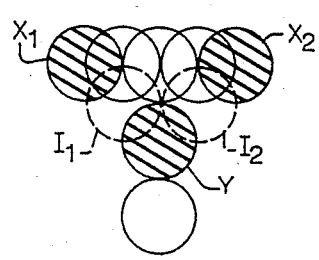
Figure 7C:
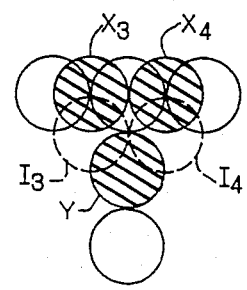

However, it is not always desirable to fill in diagonals of this type occurring in a character. For example, if a diagonal is formed by a vertical line intersecting a horizontal line in a character, filling in all the spaces between adjacent dots forming half diagonals and full diagonals could destroy the shape of the character. This situation is illustrated in FIG. 7. FIG. 7a shows a vertical line V intersecting a horizontal line H. FIG. 7b shows that, if the general rule is applied, fill-in dots $I_1$ and $I_2$ will be inserted between the pairs of dots $X_1Y$ and $X_2Y$ forming full diagonals and FIG. 7c shows that, if the general rule is applied, fill-in dots $I_3$ and $I_4$ will be inserted between the pairs of dots $X_3Y$ and $X_4Y$ forming half diagonals. For clarity fill-in dots $I_1$, $I_2$ and $I_3$, $I_4$ are shown in the separate FIGS. 7b and 7c but it will be appreciated that, if the general rule is applied, all these fill-in dots will be inserted. Insertion of all these fill-in dots will destroy the shape of the character and therefore the general rule is not to be applied in these circumstances.

Figure 8A:
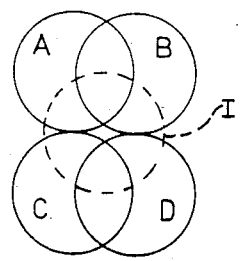
FIGS. 8a and 8b illustrate two modified forms of the general rule.
Figure 8B:
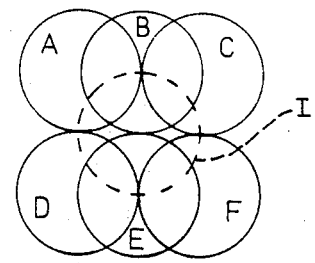

An improved rule to be followed in inserting additional fill-in dots between pairs of dots forming half diagonals and full diagonals in order not to destroy the shape of the character when a vertical line intersects a horizontal line can be fully expressed as follows referring to FIGS. 8a and 8b. As illustrated in FIG. 8a a fill-in dot I will be inserted into a half diagonal AD or BC as illustrated if dot A and dot D are present and neither dot B nor dot C is present or if dot B and dot C are present and neither dot A nor dot D is present. This can be represented by the following:

Fill-in dot $= (A \cdot D \cdot \overline{B} \cdot \overline{C}) + (\overline{A} \cdot \overline{D} \cdot B \cdot C)$ As illustrated in FIG. 8b a fill-in dot I will only be inserted into a full diagonal AF if neither dot B nor dot E is present and will only be inserted into a full diagonal CD if neither dot B nor dot E is present. This can be represented by the following:

Fill-in dot $= \overline{B} \cdot \overline{E}(A \cdot F + C \cdot D)$

Figure 9A:
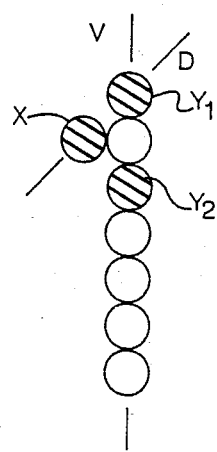
FIGS. 9a-9d illustrate further situations in which the general rule for enhancement in the diagonal direction is not to be applied.
Figure 9B:
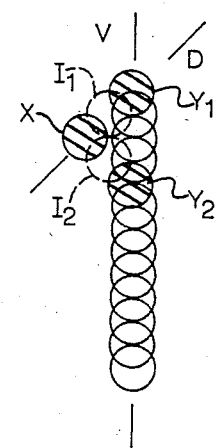

There is another situation in which it is undesirable to fill in all full diagonals occurring in a character and this is when a diagonal line intersects a vertical line near one end of the vertical line. This situation is illustrated in FIG. 9. FIG. 9a shows a diagonal line D intersecting the end of a vertical line V in the numeral "1" and FIG. 9b shows that, if the general rule is applied, fill-in dots $I_1$ and $I_2$ will be inserted between the pairs of dots $XY_1$ and $XY_2$ forming full diagonals, as well as in other positions. Insertion of fill-in dot $I_1$ enhances the shape of the serif at the top of the character but insertion of the fill-in dot $I_2$ destroys the shape of the serif. Fill-in dot $I_2$ therefore should not be inserted.

Figure 9C:
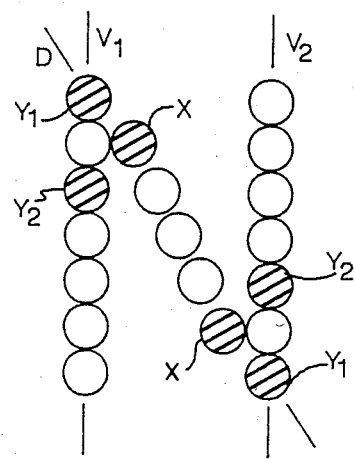
Figure 9D:
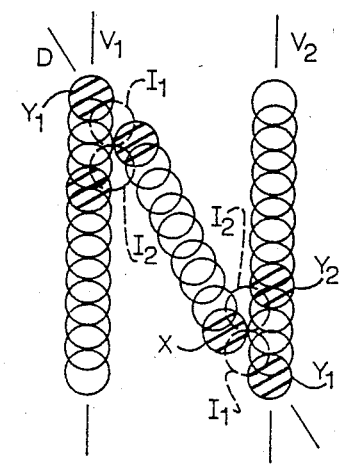

A similar situation is illustrated in FIG. 9c which shows a diagonal line D intersecting the ends of the vertical lines $V_1$ and $V_2$ of the character "N" and FIG. 9d which shows that, if the general rule is applied, fill-in dots $I_1$ will be inserted between the two pairs of dots $XY_1$ and fill-in dots $I_2$ will be inserted between the two pairs of dots $XY_2$. As before, the insertion of fill-in dots $I_1$ enhances the shape of the character but insertion of fill-in dots $I_2$ destroys the shape of the character. Fill-in dots $I_2$ therefore should not be inserted.

An improved rule to be followed in inserting fill-in dots between pairs of dots forming full diagonals in order to implement the principles illustrated in FIGS. 6, 7, 8 and 9 can be expressed as follows referring to FIGS. 10, 11 and 12.

FIG. 10, which is a modified form of FIG. 8b, illustrates possible arrangements of dots in the region of the intersection of a diagonal line with a vertical line in a character. For example one diagonal line $D_1$ including dots C and D and another diagonal line $D_2$ including dots A and F both intersect vertical line $V_1$ including dots G, A, D and I and vertical line $V_2$ including dots H, C, F and J. If the lines $D_1$ and $D_2$ are true diagonals neither dot B nor dot E will be present. FIG. 11a illustrates a diagonal line $D_1$ including dots C and D not intersecting a vertical line. In this situation (as already described above in connection with FIG. 8b) dots A, I, H and F are not present and a fill-in dot $I_1$ is to be inserted. In this FIG. 11a and in FIGS. 11b to 11g discussed below it is immaterial whether or not dots G and J are present.

FIG. 11b illustrates a diagonal line $D_1$ including dots C and D intersecting the lower end of a vertical line $V_2$ including dots H and C. In this case dots A, I and F are not present and a fill-in dot $I_1$ is to be inserted.

FIG. 11c illustrates a diagonal line $D_1$ including dots C and D intersecting the upper end of a vertical line $V_2$ including dots C and F. In this case dots A, I and H are not present and a fill-in dot $I_1$ is to be inserted.

FIG. 11d illustrates a diagonal line $D_1$ including dots C and D intersecting the middle of a vertical line $V_2$ including dots H, C and F. In this case dots A and I are not present but dots H and F are present and a fill-in dot $I_1$ is not to be inserted.

FIG. 11e illustrates a diagonal line $D_1$ including dots C and D intersecting the lower end of a vertical line $V_1$ including dots D and I. In this case dots A, H and F are not present and a fill-in dot $I_1$ is to be inserted.

FIG. 11f illustrates a diagonal line $D_1$ including dots C and D intersecting the lower end of a vertical line $V_1$ including dots A and D. In this case dots H, F and I are not present and a fill-in dot $I_1$ is to be inserted.

FIG. 11g illustrates a diagonal line $D_1$ including dots C and D intersecting the middle of a vertical line $V_1$ including dots A, D and I. In this case dots H and F are not present but dots A and I are present and a fill-in dot $I_1$ is not to be inserted.

From the above it will be seen that the rule for insertion of a fill-in dot between dots C and D can be expressed as follows:

Fill-in dot $= C \cdot D \cdot \overline{B} \cdot \overline{E} \cdot (\overline{A} + \overline{I}) \cdot (\overline{H} + \overline{F})$ FIG. 12a illustrates a diagonal line $D_2$ including dots A and F not intersecting a vertical line. In this situation (as already described above in connection with FIG. 6f) dots G, D, C and J are not present and a fill-in dot $I_1$ is to be inserted. In this FIG. 12a and in FIGS. 12b to 12g discussed below it is immaterial whether or not dots H and I are present.

FIG. 12b illustrates a diagonal line $D_2$ including dots A and F intersecting the lower end of a vertical line $V_1$ including dots G and A. In this case dots C, J and D are not present and a fill-in dot $I_1$ is to be inserted.

FIG. 12c illustrates a diagonal line $D_2$ including dots A and F intersecting the upper end of a vertical line $V_1$ including dots A and D. In this case dots C, J and G are not present and a fill-in dot $I_1$ is to be inserted.

FIG. 12d illustrates a diagonal line $D_2$ including dots A and F intersecting the middle of a vertical line $V_1$ including dots G, A and D. In this case dots C and J are not present but dots G and D are present and a fill-in dot $I_1$ is not to be inserted.

FIG. 12e illustrates a diagonal line $D_2$ including dots A and F intersecting the lower end of a vertical line $V_2$ including dots F and J. In this case dots C, G and D are not present and a fill-in dot $I_1$ is to be inserted.

FIG. 12f illustrates a diagonal line $D_2$ including dots A and F intersecting the lower end of a vertical line $V_2$ including dots C and F. In this case dots G, D and J are not present and a fill-in dot $I_1$ is to be inserted.

FIG. 12g illustrates a diagonal line $D_2$ including dots A and F intersecting the middle of a vertical line $V_2$ including dots C F and J. In this case dots G and D are not present but dots C and J are present and a fill-in dot $I_1$ is not to be inserted.

From the above it will be seen that the rule for insertion of a fill-in dot between dots A and F can be expressed as follows:

$$\text{Fill-in dot} = A \cdot F \cdot \overline{B} \cdot \overline{E} \cdot \overline{(C+J)} \cdot \overline{(G+D)}$$

The general rule for insertion of a fill-in dot between two dots forming a full diagonal can therefore be expressed as follows:

$$\text{Fill-in dot} = \overline{B} \cdot \overline{E} \cdot (C \cdot D \cdot \overline{(A+I)} \cdot \overline{(H+F)} + A \cdot F \cdot \overline{(C+J)} \cdot \overline{(G+D)})$$

Relating the situations described above with reference to FIGS. 11 and 12 to the characters illustrated in FIG. 9 it can be seen as follows.

In FIG. 9b the dots $XY_1$ correspond to dots C and D in FIG. 11c and therefore a fill-in dot $I_1$ is to be inserted. The dots $XY_2$ correspond to dots A and F in FIG. 12g and therefore a fill-in dot $I_2$ is not to be inserted.

In FIG. 9d the dots $XY_1$ at the top of the character correspond to dots A and F in FIG. 12c and therefore a fill-in dot $I_1$ is to be inserted. The dots $XY_1$ at the bottom of the character correspond to dots A and F in FIG. 12f and therefore a fill-in dot $I_1$ is to be inserted. The dots $XY_2$ at the top of the character correspond to dots C and D in FIG. 11g and therefore a fill-in dot $I_2$ is not to be inserted. The dots $XY_2$ at the bottom of the character correspond to dots C and D of FIG. 11d and therefore a fill-in dot $I_2$ is not to be inserted.

To provide full enhancement of a character in the horizontal, vertical and diagonal directions two print passes over the print area are needed at slow speed. The first pass prints the character in low quality print and, because the speed is low, all the data elements for horizontal enhancement as illustrated in FIG. 4b are used. Dots are printed at half dot spacing in the horizontal direction resulting in horizontal enhancement by providing dense character elements in the horizontal direction as illustrated in FIG. 4c. The above rules are then applied to the data elements in order to provide the additional fill-in dots for vertical and diagonal enhancement. The medium is then incremented by one half dot space and the additional dots printed resulting in increasing the density of the character elements in the vertical and diagonal directions.

FIGS. 13a, 13b illustrate characters H,N respectively printed in a low quality print and in a high quality print after full enhancement in the horizontal, vertical and diagonal directions in accordance with the rules in the above description.

FIG. 14 illustrates diagrammatically a control circuit for the printer of FIG. 1 which is used to implement the rules for use and enhancement of character data as described above. The control circuit includes a control unit 21, a character data storage unit 22, a logic unit 23, a print medium controller 24, a print head actuator unit 25 and a print head movement controller 26.

The character data for printing all characters is stored in storage unit 22 which is formed with a plurality of storage devices 16. For each character to be printed by the printer, data elements for printing at a low speed with full horizontal enhancement are stored in a corresponding storage device 16 (see FIG. 4b).

The print medium controller 24, under the control of signals from control unit 21, provides signals to the motor 9 to control the movement of the print medium 2 over the platen and past the print head 11.

The print head actuator unit 25 provides signals to actuate the printing elements 14 of print head 11 under the control of signals from control unit 21 and in accordance with data signals from data storage unit 22 and from logic unit 23. The logic unit 23 performs logical operations on the character data in storage unit 22 and supplies the results to actuator unit 25. The control unit 21 controls the flow of data between the data storage unit 22, the logic unit 23 and the print head actuator unit 25.

The print head movement controller 26, under the control of control unit 21, provides signals to motor 13 to move the print head 11 across the print medium 2.

For operation of the printer to print characters at a high speed and in a low quality print the control unit 21 through the logic unit 23 controls the supply from storage unit 22 of the character data in each storage device 16 corresponding to a character to be printed but omitting certain data elements in accordance with the first rule defined above with reference to FIG. 4. In applying this rule, where in any storage device 16 two adjacent storage locations in the horizontal direction contain binary 1 data elements, the second binary 1 data element as viewed in the direction of read out of the storage device is omitted resulting in less dense printing of the character elements in the horizontal direction. There are no extra data elements available for increasing the density in the vertical and diagonal directions.

As described above with reference to FIG. 4 in the particular case of printing the character H the data elements in columns 2, 4, 6 and 8 are omitted but the application of the rule will be different for printing other characters. The print head actuator unit 25 produces corresponding signals to the printing elements in head 11 in order to cause printing to occur. The control unit 21 also controls the signals applied to motors 9, 13 to cause movement of the print head 11 and print medium 2 as necessary.

For operation of the printer to print characters at a low speed in a high quality print the control unit 21 first controls the supply to print head actuator unit 26 of all the data in each storage device 16 corresponding to each character to be printed and causes movement of the print head 11 across the print medium to print initially all the character elements needed to print in a low quality, but with enhancement in the horizontal direction as illustrated in FIG. 4c, by printing all the character elements corresponding to the stored data. The control unit 21 then causes movement of the print medium 2 through a distance equal to half the spacing between adjacent printing elements 14. Upon completion of this movement of the medium the control unit 21 causes logic unit 23 to perform the logical operations described with reference to FIG. 5 on the data for each character already printed and to pass to the actuator unit 25 character data corresponding to additional character elements to be printed for enhancement of each character in the vertical direction.

In order to perform the logical operations described above with reference to FIG. 5, the logic unit 23 includes devices for detecting the data elements which will result in character elements being printed in adjacent positions in the vertical direction and other devices for generating the additional data elements for providing the fill-in dots.

In order to perform the logical operations described above with reference to FIGS. 6 to 12, the logic unit 23 includes devices for detecting the data elements which will result in character elements being printed in adjacent positions in the diagonal direction and other devices for generating the additional data elements for providing the fill-in dots. The logic unit also includes devices for detecting the presence of other data elements and preventing the data elements for fill-in dots being generated when such other data elements are detected.

At the same time the control unit 21 causes logic unit 23 to perform the logical operations described with reference to FIGS. 6 to 12 on the data for each character already printed, and to pass to the actuator unit 25 character data corresponding to additional character elements to be printed for enhancement of each character in the diagonal direction.

As the additional character data is passed to actuator unit 25, the control unit 21 causes the print head actuator unit 25 to provide signals for the operation of the printing elements, in accordance with the two sets of additional character data, in a second printing operation at a low speed. The result is enhancement of the characters printed in the vertical and diagonal directions as described above by increasing the density of the character elements in these directions.

By the above described double printing operation the density of the character elements in the horizontal, vertical and diagonal directions is increased and a high print quality character is printed. It will be appreciated that this result is obtained without needing any increase in the size of the storage unit 22.

While there has been described with reference to FIG. 14 a control circuit for the printer of FIG. 1, in a preferred embodiment of the invention a program controlled microprocessor is used to implement the control unit 21 and logic unit 23.

In a practical embodiment of the invention each of the printing elements 14 in the head 11 prints a circular dot which has a diameter of 1/60 inch and the spacing between the centers of adjacent elements is equal to the diameter of each dot so that, in the vertical direction, adjacent printed dots will just touch.

In order to print a character in a low print quality at a high speed the speed of movement of the head 11 across the print medium 2 and the frequency of operation of the printing elements 14 are chosen so that adjacent columns of dots in the horizontal direction have a spacing of 1/120 inch between centers. As a result, in the horizontal direction, adjacent printed dots overlap by half the diameter of a dot. A matrix of 9 columns of dots is used to print each character. As described above, for each character to be printed, the character data elements in the corresponding storage device 16 are used but omitting certain data elements in accordance with the rule defined above with reference to FIG. 4.

In order to print a character in a high quality at a low speed, two print passes over the medium 2 are used. For the first print pass the speed of movement of the head 11 and the frequency of operation of the printing elements 14 are chosen so that adjacent columns of dots in the horizontal direction have a spacing of 1/120 inch between centers providing an overlap as above. After the first print pass the print medium 2 is moved a distance of 1/120 inch. For the second print pass the speed of movement of the head 11 and the frequency of operation of the printing elements 14 are chosen so that adjacent columns of dots in the horizontal direction have a spacing of 1/120 inch.

In printing characters in high quality at the low speed, for the first print pass dots are printed in a maximum of 9 columns for each character. In the second print pass dots are printed in a maximum of 17 columns for each character at the higher frequency of operation of the printing elements, so that odd numbered columns of the second print pass coincide with the columns of the first print pass. As described above, for the first print pass for each character to be printed all the character data in the corresponding storage device 16 is used. For the second print pass the additional character data for "fill-in" dots generated in accordance with the rules defined above with reference to FIGS. 5 to 12 is used as follows. For the odd numbered columns of dots in the second print pass the additional data for "fill-in" dots generated in accordance with the rule defined with reference to FIG. 5 for vertical enhancement and the additional data for "fill-in" dots generated in accordance with the rule defined above with reference to FIGS. 6 to 12 for "full diagonals" are both used. For the even numbered columns of dots in the second print pass the additional data for "fill-in" dots generated in accordance with the rule of FIG. 6 for "half diagonals" is used.

FIG. 15 is a flow chart describing the logical operations which will be performed by the logic unit 23 illustrated in FIG. 14 in order to implement the above principles. In the preferred embodiment the logical operations will be performed by suitably programming the microprocessor in accordance with the flow chart of FIG. 15. In this flow chart the term COLUMN is used to denote the character data which is suppled to the actuators of the printing elements 14 and the term SLICE is used to denote the character data in the portion of the storage device 16 corresponding to each printing element 14. As will be described below the SLICE data is modified in accordance with the rules established in order to produce the COLUMN data. The index i is used to denote the number of the column of dots to be printed. A, B, C represent temporary variables. ASL, BSL, CSL represent further temporary variables each having the value of A, B or C respectively after being shifted one space to the left (higher order). For example if A=01110011 then ASL=11100110, with the lowest order bit of the shifted variable (ASL, BSL, CSL) always being 0 and the highest order bit of the basic variable (A, B or C) being discarded. ASL2, BSL2, CSL2 represent still further temporary variables each having the value of A, B or C respectively after having been shifted two spaces to the left in accordance with the above rules.

Figure 15A:
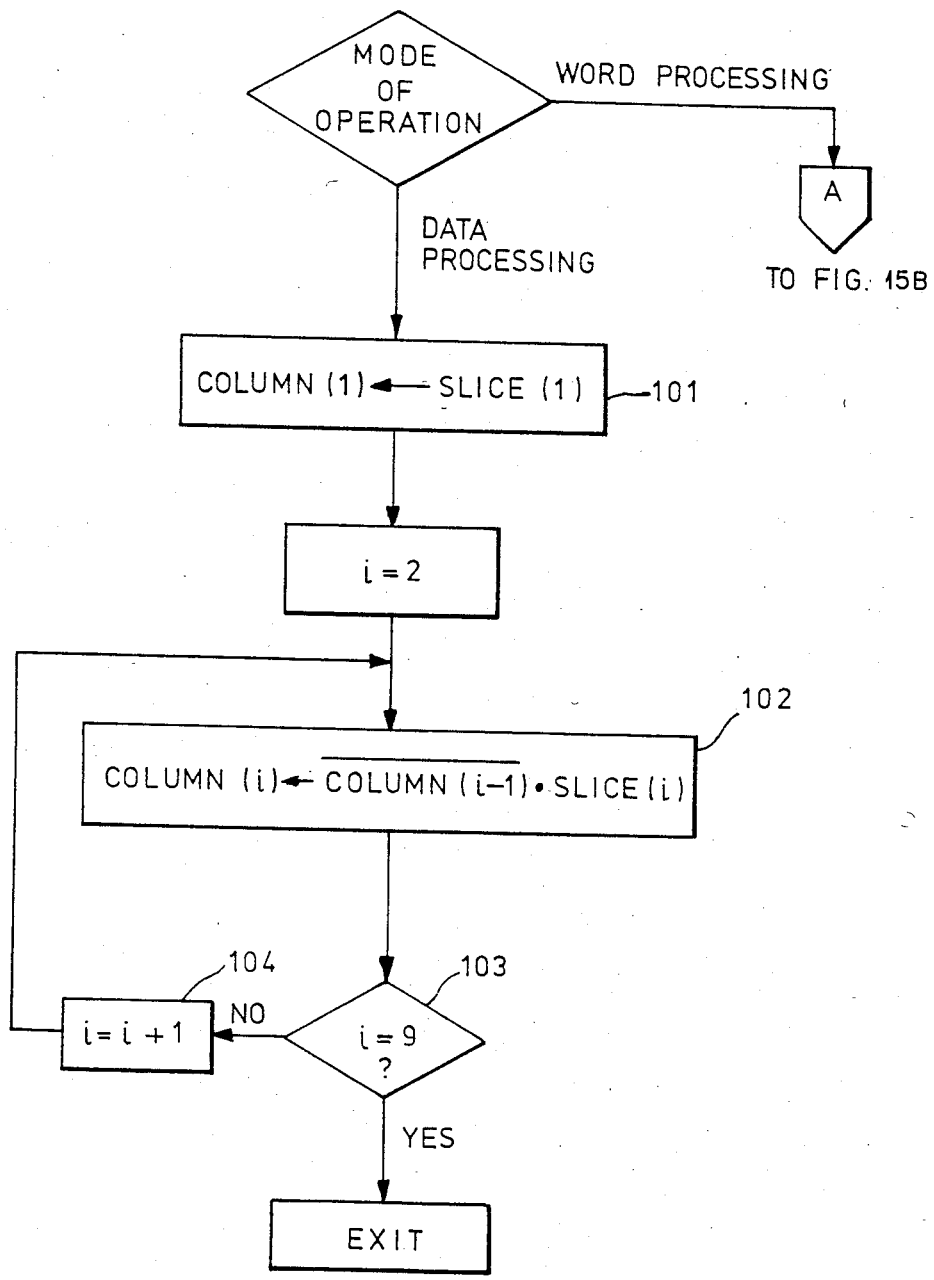
Figure 15B:
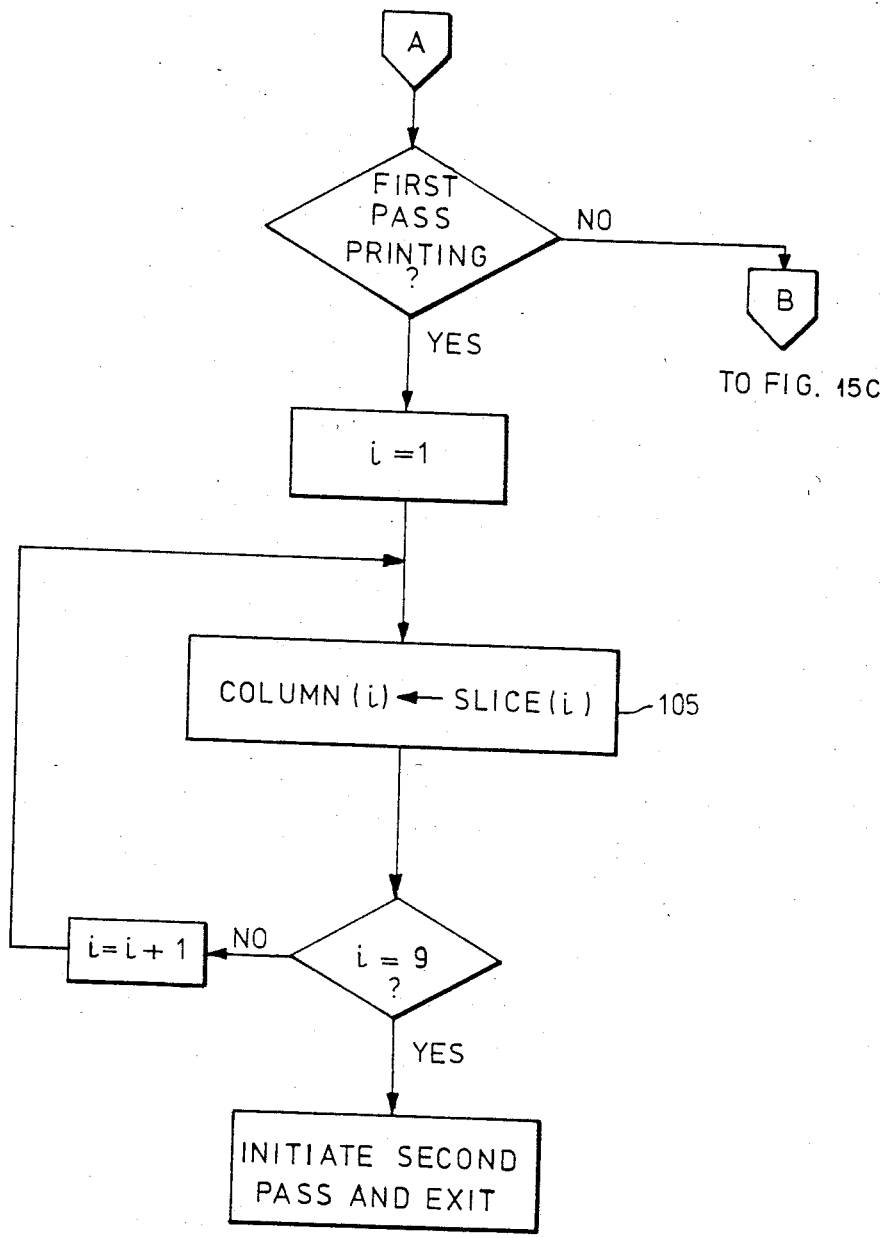

FIG. 15a is a flow chart of the logical operations which will be performed for printing characters in a low quality at a high speed (data processing) and in general terms represents the following sequence of operations. After determining that characters are to be printed in low quality at high speed the first column (column 1) of dots for the first character is printed using the character data in the first column of the corresponding data storage device 16 (SLICE=COLUMN) as indicated in box 101. The index is then shifted to column 2. In order to omit certain character data elements in accordance with the rule of FIG. 4 the character data suppled to the printing elements for column 1 (COLUMN) is inverted and ANDed with the character data for column 2 (SLICE) as indicated in box 102 to produce the correct data for the printing element actuators (COLUMN). This operation is repeated for the remaining columns 3 to 9 as indicated by boxes 103 and 104 until the whole of the character has been printed.

FIGS. 15b to 15f are flow charts of the logical operations which will be performed for printing in a high quality at a low speed (word processing) and in general terms represents the following sequence of operations.

After determining that characters are to be printed in high quality at a low speed, in accordance with the flow chart of FIG. 15a the flow chart of 15b is entered. For the first print pass all the character data in the storage device (SLICE) is passed to the print element actuators and used for printing (COLUMN) all of the 9 columns of dots as indicated in box 105. At this stage, before the second print pass, the medium 2 will be moved through a distance of 1/120 inch as described above.

Figure 15C:
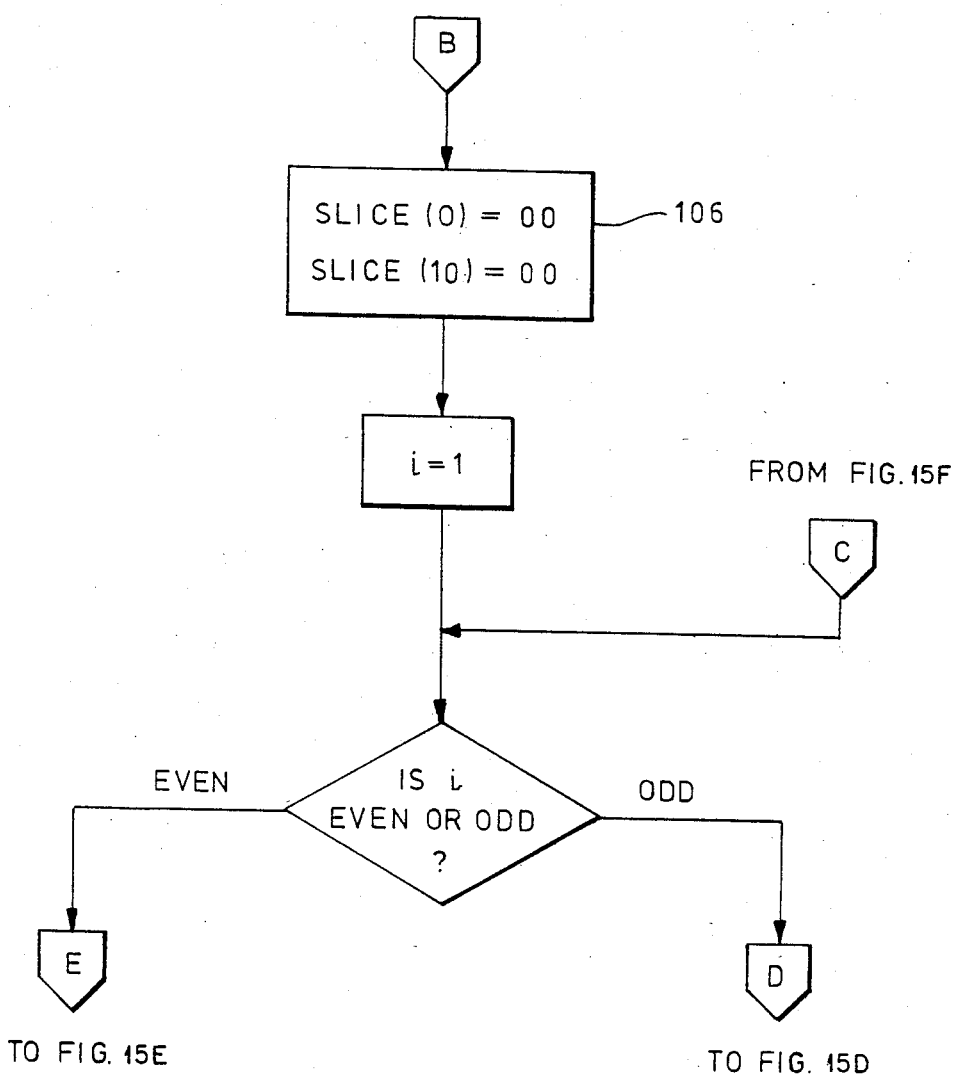

For the second print pass the flow chart of FIG. 15c is entered. First of all, two additional items of character data are generated as if they were in the storage device 16 and these are termed SLICE 0 and SLICE 10 respectively. The values of SLICE 0 and SLICE 10 are both zero as indicated in box 106.

For the printing of odd numbered columns the flow chart of FIG. 15d is entered. For each column in succession, the variables A, B, C are set up as indicated in boxes 107, 108, 109 using SLICE data. In calculating the values of A, B, C, integer arithmetic is assumed. For example:

If $i = 1$
$A = (i - 1)/2 = (1 - 1)/2 = 0/2 = 0$
$B = (i + 1)/2 = (1 + 1)/2 = 2/2 = 1$
$C = (i + 1)/2 + 1 = (1 + 1)/2 + 1 = 1 + 1 = 2$

For each column of dots, values for ASL, BSL, CSL, ASR, ASL2, CSR and CSL2 are also calculated as indicated in boxes 110, 111, 112, 113, 114, 115, 116 and these values are used to calculate the value of the COLUMN data for each printing element to be used in printing the associated column of dots as indicated in box 117. For each value of the COLUMN data calculated from the formula in box 117 the expression (B·BSL) represents the generation of additional data for printing vertical fill-in dots in accordance with the rule of FIG. 5 and the remaining expression represents the generation of additional data for printing fill-in dots for "full diagonals" in accordance with the rule of FIGS. 6 to 12.

Figure 15F:
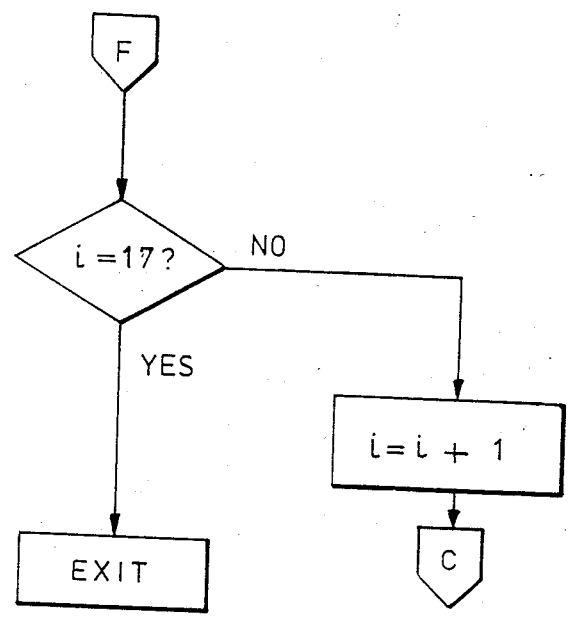

When the COLUMN data for each printing element needed for printing the dots of an odd numbered column has been calculated and the printing operation completed, the flow chart of FIG. 15f is entered. Until the last column (17) of dots has been printed this flow chart will lead back to the flow chart of FIG. 15c. The flow chart of FIG. 15c is followed and, since the next column will be an even numbered column, the flow chart of FIG. 15e will then be entered as described below.

For the printing of even numbered columns in the second print pass the flow chart of FIG. 15e is entered. For each column of dots to be printed, the variables A and B are set up as indicated in boxes 118 and 119 using SLICE data and in calculating these values integer arithmetic is used as described above with reference to FIG. 15d. For example:

If $i = 6$
$A = i/2 + 1 = 6/2 + 1 = 4$

-continued
$B = i/2 = 6/2 = 3$

For each column of dots, values for ASL and BSL are also calculated as indicated in boxes 120 and 121 and these values are used to calculate the value of the COLUMN data for each printing element to be used for printing the associated column of dots as indicated in box 122. When a variable being calculated includes an inversion ($\overline{A}$) and a shift ($\overline{ASL}$) of a basic variable the inversion is performed before the shift. Each value of COLUMN data calculated from the formula in box 122 represents the generation of additional data for printing fill-in dots for "half diagonals" in accordance with the rule of FIG. 6.

When the COLUMN data for each printing element needed for printing the dots of an even numbered column has been calculated and the printing operation completed the flow chart of FIG. 15f is entered. Until the last column (17) of dots has been printed this flow chart will lead back to the flow chart of FIG. 15c. The flow chart of FIG. 15c is followed and since the next column will be an odd numbered column the flow chart of FIG. 15e will then be re-entered as described above.

The calculations to produce COLUMN data for each of the printing elements for the odd and even numbered columns of dots and the associated printing operations are continued until column 17 has been printed. At this stage the printing of the character in high quality print is completed.

It will be appreciated that for printing a line of characters in high quality at a low speed, during the first print pass all of the character data for all of the characters to be printed in the line will be used. During the second print pass additional character data for all of the characters in the print line will be generated so that at the end of the second print pass all the characters in the line will have been printed in the high quality.

What we claim is:

1. A printer for printing characters in two alternative print qualities by printing selected character elements in a matrix of positions arranged in horizontal rows and vertical columns comprising
   storage means for storing sets of character data elements, each set defining the shape of a respective character which has a high print quality in the horizontal direction and a low print quality in the vertical and diagonal directions,
   printing means for printing character elements defining characters when supplied with character data elements derived from said sets of character data elements,
   means for selecting a low or a high print quality,
   logic means responsive to the selection of a low print quality to derive subsets of the character data elements of said stored sets, each of which subsets defines the shape of the respective character less densely in the horizontal direction, and
   control means responsive to the selection of low print quality to control the operation of said logic means and to supply to said printing means selectively said subsets of character data elements,
   whereby said printing means in responsive to the receipt of each of said subsets of character data elements to print character elements defining a respective character which has a low print quality in all directions, said logic means being further responsive to the selection of a high print quality to perform logical operations on the character data elements of said stored sets so as to generate associated additional character data elements for each set which define the shape of the respective character more densely in the vertical and diagonal directions, said control means also being responsive to the selection of high print quality to control said logic means and to supply to said printing means selectively said stored sets of character data elements together with said associated additional character data elements, whereby said printing means is responsive to the receipt of each of said stored sets of character data elements and the associated additional character data elements to print character elements defining a respective character which has a high print quality in the horizontal direction, vertical and diagonal directions.

2. A printer for printing characters in two alternative print qualities as claimed in claim 1 in which said logic means, when responsive to the selection of a low print quality, derives a subset of the character data elements of each stored set which includes all the character data elements of said set except any character data element which, when used for printing, would result in the printing of a character element in a print position adjacent in the horizontal direction to a print position in which a character element would have previously been printed.

3. A printer for printing characters in two alternative print qualities as claimed in claim 1 in which said logic means, when responsive to the selection of a high print quality, detects any stored character data elements which, when used for printing, would result in the printing of character elements in two adjacent positions in the vertical direction and, upon detection of any such character data element, generates an additional character data element which, when used for printing, would result in the printing of an additional character element in the print position between said two adjacent print positions.

4. A printer for printing characters in two alternative print qualities as claimed in claim 1 in which said logic means, when responsive to the selection of a high print quality, detects any stored character data elements which, when used for printing, would result in the printing of character elements in two adjacent positions in a direction which is at an angle to the horizontal and vertical directions and, upon detection of any such character data element, generates an additional character data element which, when used for printing, would result in the printing of an additional character element in the print position between said two adjacent print positions.

5. A printer for printing characters in two alternative print qualities as claimed in claim 4 in which said logic means, when responsive to the selection of a high print quality, detects any other stored character data element which, when used for printing, would result in the printing of a character element in a print position located adjacent in the horizontal direction to one of said two adjacent positions on the side of said one print position nearest to the other print position and, upon the detection of any such other character data element, modifies its own performance so as not to generate said additional character data element.

6. A printer for printing characters in two alternative print qualities as claimed in claim 5 in which said logic means, when responsive to the selection of a high print quality, detects any two other stored character data elements which, when used for printing, would result in the printing of character elements in print positions located adjacent in the vertical direction to and respectively above and below one of said two adjacent positions and, upon the detection of such two other character data elements, modifies its own performance so as not to generate said additional character data element.

7. A printer for printing characters in two alternative print qualities as claimed in claim 1 in which said logic means comprises a program controlled microprocessor.

8. A method for printing characters in two alternative print qualities by printing selected character elements in a matrix of positions arranged in horizontal rows and vertical columns comprising storing sets of character data elements, each set defining the shape of a respective character which has a high print quality in the horizontal direction and a low print quality in the vertical and diagonal directions, selecting a high or a low print quality, deriving, in response to the selection of a low print quality, subsets of the character data elements of said stored sets, each of which subsets defines the shape of the respective character less densely in the horizontal direction, and selectively using each of said subsets of character data elements to print character elements defining a respective character which has a low print quality in all directions, or alternatively performing in response to the selection of a high print quality, logical operations on the character data elements of said stored sets so as to generate associated additional character data elements for each set which define the shape of the respective character more densely in the vertical and diagonal directions, and selectively using each of said stored sets of character data elements together with said associated additional character data elements in order to print character elements defining a respective character which has a high print quality in the horizontal direction, vertical and diagonal directions.

9. A method of printing characters in two alternative print qualities as claimed in claim 8 in which said subset derivation in response to the selection of a low print quality comprises including all the character data elements of said set except any character data element which, when used for printing, would result in the printing of a character element in a print position adjacent in the horizontal direction to a print position in which a character element would have previously been printed.

10. A method of printing characters in two alternative print qualities as claimed in claim 8 in which said performance of logical operations in response to the selection of a high print quality comprises detecting any stored character data elements which, when used for printing, would result in the printing of character elements in two adjacent positions in the vertical direction and, upon detection of any such character data element, generating an additional character data element which, when used for printing, would result in the printing of an additional character element in the print position between said two adjacent print positions.

11. A method of printing characters in two alternative print qualities as claimed in claim 8 in which said performance of logical operations in response to the selection of a high print quality comprises detecting any stored character data elements which, when used for printing, would result in the printing of character elements in two adjacent positions in a direction which is at an angle to the horizontal and vertical directions and, upon detection of any such character data element, generating an additional character data element which, when used for printing, would result in the printing of an additional character element in the print position between said two adjacent print positions.

12. A method of printing characters in two alternative print qualities as claimed in claim 11 in which said performance of logical operations in response to the selection of a high print quality further comprises detecting any other stored character data element which, when used for printing, would result in the printing of a character element in a print position located adjacent in the horizontal direction to one of said two adjacent positions on the side of said one print position nearest to the other print position and, upon the detection of any such other character data element, modifying the performance of said logical operations so as not to generate said additional character data element.

13. A method of printing characters in two alternative print qualities as claimed in claim 12 in which said performance of logical operations in response to the selection of a high print quality further comprises detecting any two other stored character data elements which, when used for printing, would result in the printing of character elements in print positions located adjacent in the vertical direction to and respectively above and below one of said two adjacent positions and, upon the detection of any two such other character data elements, modifying the performance of said logical operations so as not to generate said additional character data element.

14. A method of printing characters in two alternative print qualities as claimed in claim 8 in which said subset derivation selection operations and said logical operations are performed by a program controlled microprocessor.

* * * * *